H. J. HOYT.
TIRE INSPECTING MACHINE.
APPLICATION FILED MAR. 26, 1915.
1,193,691.
Patented Aug. 8, 1916.
3 SHEETS—SHEET 1.
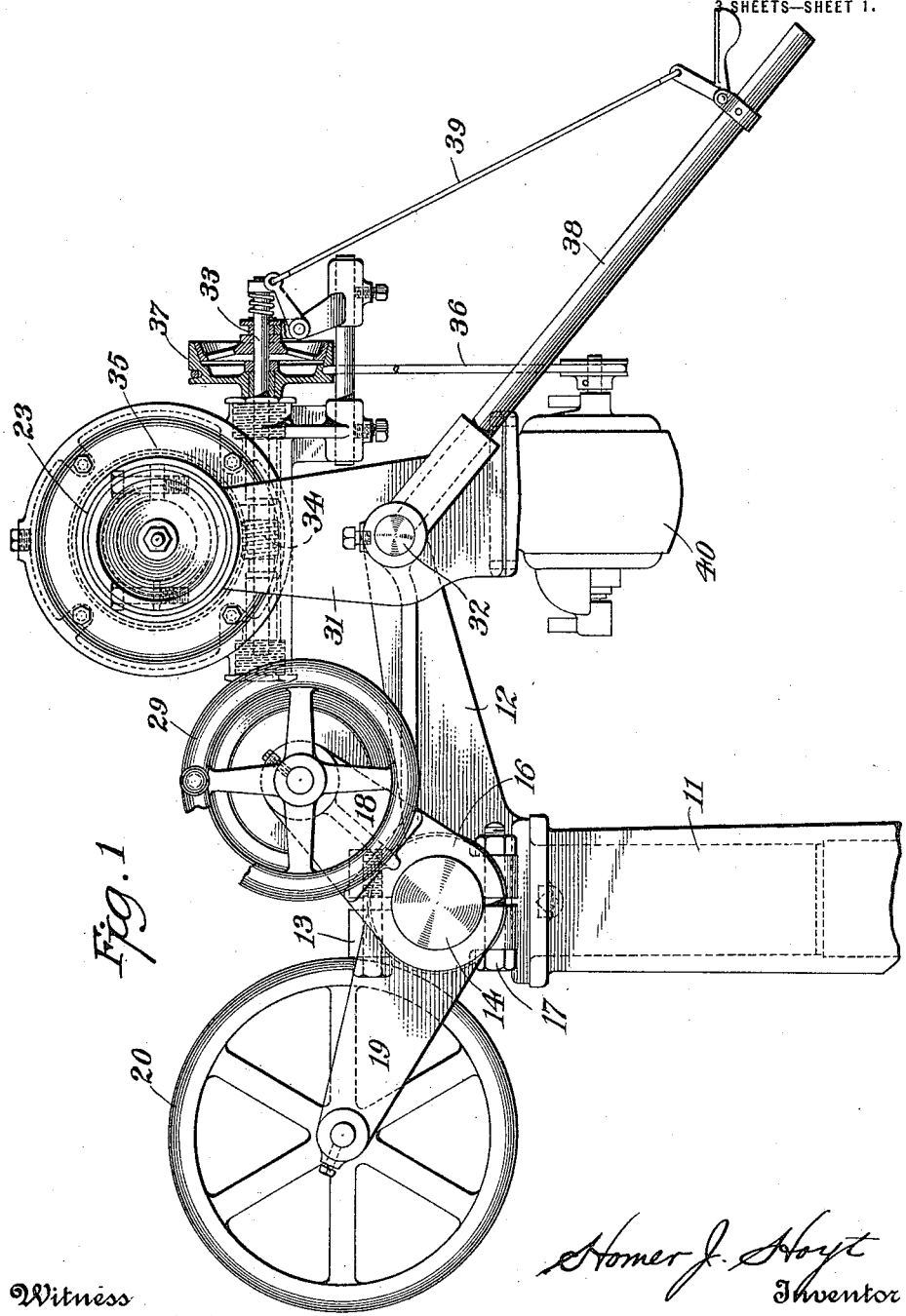

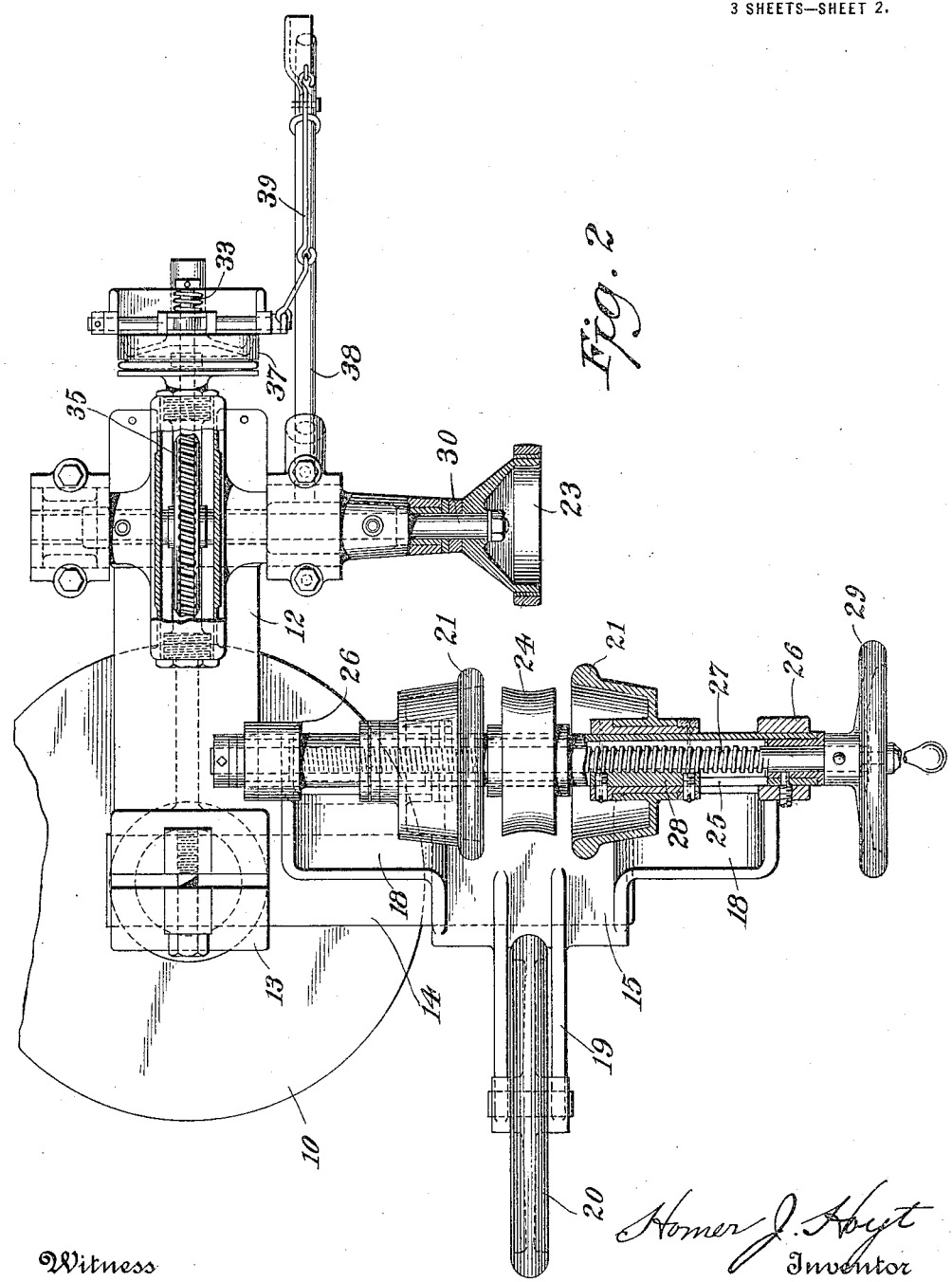

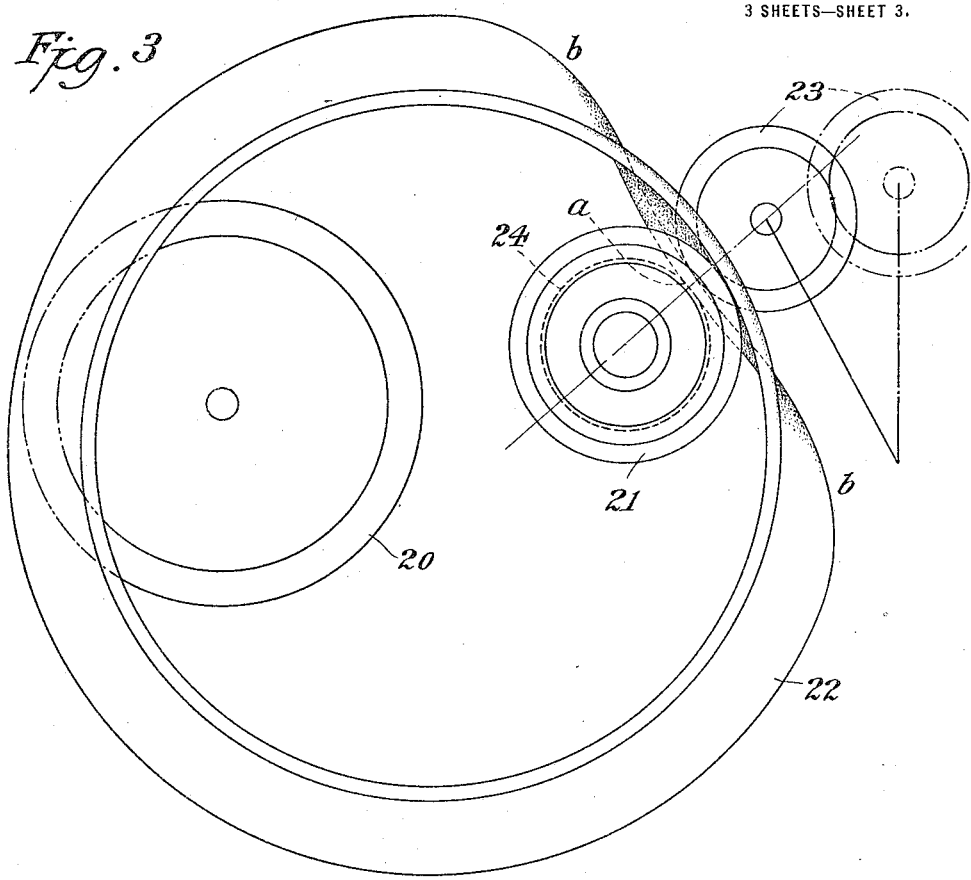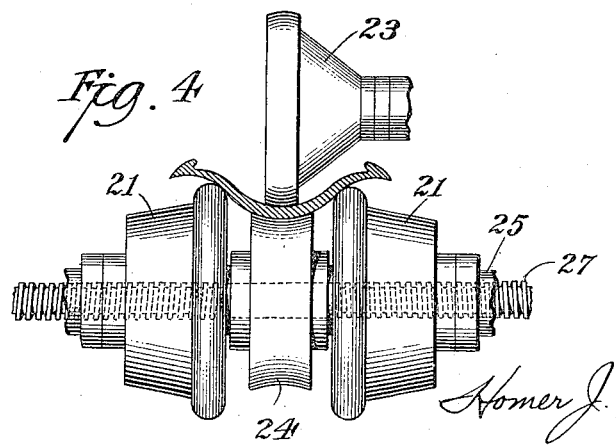

UNITED STATES PATENT OFFICE.

HOMER J. HOYT, OF DETROIT, MICHIGAN, ASSIGNOR TO MORGAN & WRIGHT, A CORPORATION OF MICHIGAN.

TIRE-INSPECTING MACHINE.

1,193,691.   Specification of Letters Patent.   Patented Aug. 8, 1916.

Application filed March 26, 1915. Serial No. 17,117.

*To all whom it may concern:*

Be it known that I, HOMER J. HOYT, a citizen of the United States, and a resident of Detroit, county of Wayne, and State of Michigan, have invented certain new and useful Improvements in Tire-Inspecting Machines, of which the following is a full, clear, and exact description.

This invention relates to tire inspecting machines and has for an object to provide a machine for supporting and reversely bulging a tire at the tread, thereby producing a sharp bend near the reverse bulge in which bend the tire material is stretched and strained so that imperfections are enhanced and magnified to such an extent as to be easily detected.

Usually a tire is manually manipulated during inspection, that is, the inspector produces a sharp bend in the tire by gripping it at the bead portions and bowing the tire inwardly by pressing his knee on the tread between the gripped bead portions, the imperfections and flaws appearing as blisters or bubbles in the sharp bend which forms in the tire near the bowed-in portion. To obviate this manual manipulation of the tire and permit of the operator directing his entire expert attention to the detection of flows, the present invention provides a machine which sustains the tire in a convenient position for inspection, bows or bulges the tire inwardly at one point to produce a sharp bend wherein imperfections are aggravated and enhanced, and simultaneously feeds the supported tire in a path through said bulge or bow forming mechanism, whereby said bend will pass as a wave or ripple along the tire during one continuous revolution thereof and thus promote inspection of the tire in a minimum time.

With the above and other objects in view the invention consists of certain novel details of construction and combinations of parts hereinafter fully described and claimed it being understood that various modifications may be resorted to within the scope of the appended claims without sacrificing any of the advantages or departing from the spirit of the invention.

The invention will be readily understood from the following description taken in connection with the accompanying drawings in which:

Figure 1 is a side elevation of the machine; Fig. 2 is a plan view of the machine; Fig. 3 is a diagrammatic view showing the essential features of the machine; Fig. 4 is a fragmentary detail view showing the bulging or bowing mechanism.

Referring now to the drawings, 10 designates a base or foot of a standard 11, the latter having at the top a horizontally projecting arm 12 and carrying an integral split clamp 13 which confines a cylindrical bar 14 to project horizontally and at a right angle with respect to the arm 12.

A bracket 15 is secured to the free end of the bar 14 by means of a split cylindrical bearing 16 which is clamped to the bar by a bolt 17. The bracket is provided with a pair of alined arms 18 and with an arm 19 between and extending at a right angle to the arms 18. A wheel 20 is secured to the arm 19 and a pair of drums 21 are secured to the arms 18, as will hereinafter be more fully described, the wheel 20 and drums 21 forming a three-point suspension for the tire 22 to be inspected.

The inward or reverse bow or bulge is produced in the suspended tire by means of a wheel 23 which is situated in the plane of the wheel 20 and is designed to bear upon the outer face of the tire tread between the drums 21 and force the arch of the tire radially past the beads as shown at $a$. This results in the formation of a sharp bend $b$ on each side of the bow or bulge $a$. The material of the tire at these bends is stretched, slightly compressed, and abnormally strained, with the result that flaws, such as air chambers in the tire, are distorted and magnified to such an extent as to appear like bubbles or blisters at these bends.

For limiting the magnitude of the inwardly bowed portion $a$ of the tire as desired, the drums 21 are adjustably mounted to be moved toward or away from each other and thus limit the width of the inward bow or bulge, and a stop 24 in the nature of a disk is centered at all times between the drums, and forms an abutment for the tire under the urging of the wheel 23, thereby serving to limit the depth of the inward bulge or bow.

To effect the above noted adjustment of the parts, the drums 21 are splined to the sleeve 25 fixed in sockets 26 of the alined arms 18. A feedscrew 27 is revolubly mounted in the sleeve and is threaded righthanded at one end and left-handed at the other end, said threaded portions engaging corresponding racks 28 on the drums, whereby upon the feed screw being rotated by means of its hand wheel 29 the drums will be moved toward or away from the disk stop 24 which idles on the sleeve.

The wheel 23 is continuously driven and pinches the tire against the disk stop 24 with a resultant rotation of the tire on the three-point suspension whereby the uppermost sharp bend $b$, at which point the inspector watches for the appearance of imperfections, will advance like a wave or ripple through the entire tire. For driving the wheel 23 the same is fixed to a shaft 30 which is carried by an arm 31 that is pivoted at the end of the above mentioned arm 12 of the machine, as shown at 32, the shaft being slowly driven from a driving shaft 33 through the instrumentality of meshing gears 34 and 35. The shaft 33 is preferably power driven from a motor 40 carried by the arm 31 and operatively connected to the shaft 33 by a belt 36 and clutch pulley 37. A lever 38 is connected to the pivot 32 of the arm 31, whereby the latter may be rocked to engage or disengage the wheel 23 from the tire, the clutch 37 being controlled by a lever mechanism designated in general by the numeral 39 whereby upon the lever 38 being rocked to disengage the wheel 23, the clutch will be thrown off.

In operation the tire to be inspected is suspended from the inside on the wheel 20 and drums 21, and then the lever 38 is rocked to force the wheel 23 to engage and press the tire inwardly between the drums 21 and against the stop 24, thereby forming the reverse bow or bulge $a$ and sharp bends $b$ on either side thereof as above explained. The motor 40 is then started whereupon the tire will be fed in a path between the drums 21, stop 24 and wheel 23, which parts comprise the inward bulge or bow producing mechanism, consequently, causing the sharp bends $b$ to travel in the nature of a ripple or wave throughout the tire until a single revolution has been completed, whereupon the operator rocks the lever 38 to withdraw the wheel 23 from the tire and permit of the removal and replacement of the tire with a new tire to be inspected. As above explained, the inspector watches the sharp bend at the point $b$ Fig. 3, for the appearance of bubbles, blisters, or the like, which denote imperfections or flaws in the tire.

What is claimed is:

1. A tire inspecting machine embodying co-acting members forming a support for a tire to be inspected, and a member disposed between two of the said members adapted to engage the tire and force the same radially at one point between said members to assume an inward bulge or bow.

2. A tire inspecting machine embodying co-acting members forming a support for a tire to be inspected, a stop between two of said members, and a member adapted to engage the tire and force the arch of the same radially past said two members into contact with said stop thereby producing an inward bow or bulge in the tire.

3. A tire inspecting machine embodying coacting members for supporting a tire, and a rotary member contacting with the tire and serving to simultaneously rotate the tire on its axis and bow the tire inwardly at the point of contact of the tire with the rotary member.

4. A tire inspecting machine embodying co-acting members forming a three point suspension for the tire, a stop disposed on a common axis with two of said members, and a rotary wheel adapted to contact with the tire and force the same radially past said two members into contact with said stop thereby simultaneously rotating the tire on its axis and bowing the tire inwardly to the surface of said stop.

5. A tire inspecting machine, comprising means adapted to engage the inner surface of the tire at two points spaced transversely thereof, means for engaging the outer surface of the tire at a point between said two points, and means for producing relative movement between the first and second named means for temporarily changing the curvature of the tire.

6. A tire inspecting machine, comprising means adapted to engage the inner surface of the tire at two points spaced transversely thereof, means for adjusting said means for varying the space between said two points, means for engaging the outer surface of the tire at a point between said two points, and means for producing relative movement between the first and last named means for temporarily changing the curvature of the tire.

Signed at Detroit, county of Wayne, and State of Michigan, this 12th day of March, 1915.

HOMER J. HOYT.

Witnesses:
JOHN CARLSON,
H. J. WILDMAN.

Copies of this patent may be obtained for five cents each, by addressing the "Commissioner of Patents, Washington, D. C."